United States Patent
Adley

[19]

[11] Patent Number: 5,978,178
[45] Date of Patent: Nov. 2, 1999

[54] DISK DRIVE ACTUATOR ASSEMBLY WITH ARM HAVING HIGH STIFFNESS TO MASS RATIO

[75] Inventor: James M. Adley, Hutchinson, Minn.

[73] Assignee: Questek Innovations, Inc., Waconi, Wis.

[21] Appl. No.: 08/916,915

[22] Filed: Aug. 15, 1997

[51] Int. Cl.⁶ .................................................. G11B 21/16
[52] U.S. Cl. ........................................ 360/104; 360/108
[58] Field of Search .................................. 360/106, 104, 360/108

[56] References Cited

U.S. PATENT DOCUMENTS

| | | | |
|---|---|---|---|
| 4,408,238 | 10/1983 | Hearn | 360/104 |
| 4,949,194 | 8/1990 | MacPherson et al. | 360/104 |
| 5,140,482 | 8/1992 | Kimura et al. | 360/104 |
| 5,283,704 | 2/1994 | Reidenbach | 360/104 |
| 5,333,003 | 7/1994 | Archer | 343/914 |
| 5,408,372 | 4/1995 | Karam, II | 360/104 |
| 5,594,607 | 1/1997 | Erpelding et al. | 360/104 |
| 5,627,701 | 5/1997 | Misso et al. | 360/106 |
| 5,677,815 | 10/1997 | Chan | 360/106 |

FOREIGN PATENT DOCUMENTS

| | | |
|---|---|---|
| 0478196 | 4/1992 | European Pat. Off. . |
| 0649140 | 4/1995 | European Pat. Off. . |

*Primary Examiner*—John H. Wolff
*Attorney, Agent, or Firm*—Schwegman, Lundberg, Woessner & Kluth PA

[57] ABSTRACT

A disk drive system includes a base, a disk rotatably attached to the base, and an actuator assembly pivotally attached to the base. The actuator assembly moves the transducer to selected areas of the disk where information representative of data is to be written or read. The actuator assembly maintains the transducer in a transducing relationship with the disk. The actuator assembly includes an arm and a head gimbal assembly. The head gimbal assembly includes a suspension. The arm has a length from the point where it pivots to the end of the arm. The length of the arm is greater than 1.5 times the length of the suspension. The ratio of the length of the arm to the length of the suspension is in the range of 2.0 to 10.0. The arm is made of a composite material that includes elongated stiffening fibers. The resulting composite has a stiffness to mass ratio higher than aluminum, steel, or magnesium. An actuator arm made of the composite material having the high stiffness to mass ratio resonates at a frequency greater than 3 kHz, which is outside the operating range of the actuator servo bandwidth. The arm and the suspension can be thought of as having a fixed length for a certain design. The length of the arm, made of the high stiffness to mass material, is extended and the length of the suspension is shortened to form an actuator assembly of the overall length with higher than previously obtainable resonance frequencies.

8 Claims, 7 Drawing Sheets

DISK DRIVE ACTUATOR ASSEMBLY WITH ARM HAVING HIGH STIFFNESS TO MASS RATIO

FIELD OF THE INVENTION

The present invention relates to the field of mass storage devices called disk drives. More particularly, this invention relates to an actuator system having an arm made of ceramic or fiber composite or any material producing an arm with high resonant frequencies and a stainless steel or other similar material suspension.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in transducing relationship with the disk. The transducer can be used to read information representing data from the disk or write information representing data to the disk. When the disk is operating, the disk is usually spinning at a relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

The actuator assembly is composed of many parts that contribute to the performance required to accurately hold the read/write head in the proper position. There are two general types of actuator assemblies, a linear actuator and a rotary actuator. The rotary actuator includes a pivot assembly, an arm, a voice coil yoke assembly and a head gimbal suspension assembly. The rotary actuator assembly pivots or rotates to reposition the transducer. A suspension or load beam is part of the head gimbal suspension assembly. Currently the length of the arm is about equal to the length of the suspension. The length of the arm and the length of the suspension determine, in part, the resonance frequency of the actuator assembly.

One end of the suspension is attached to the actuator arm. The read/write head is found attached to the other end of the suspension. One end of the actuator arm is coupled to a pivot assembly. The pivot assembly is in turn connected to a servo motor system through the voice coil yoke. The other end is attached to the head gimbal suspension assembly. The head gimbal suspension assembly allows the read/write head to gimbal for pitch and roll to follow the topography of the imperfect memory disk surface. The head gimbal assembly also restricts motion with respect to the radial and circumferential directions of the memory disk. The suspension is coupled to the actuator arm as part of the mounting support holding the pivot support and coupled to the servo motor. Currently, the pivot assembly is mounted within an opening in a unitized E-block. The E-block includes arms for mounting the suspension on one end and a voice coil yoke on the other end. U.S. Pat. No. 5,283,704 issued to Reidenbach illustrates another actuator system composed of individual components instead of the unitized E-block. This actuator system is "built up" from an actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer. The disk drive system sends control signals to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

Actuator arms act as spring-mass-damper systems and have resonant frequencies that can degrade the performance of the servo system. Every closed loop servo motor system has a predetermined bandwidth in which resonances occurring within the bandwidth degrade the performance of the servo motor system. The actuator arm is one key source of unwanted resonances. Accordingly, the bandwidths of most servo motor systems are designed such that resonances of the actuator arm occur outside the bandwidth. Each actuator arm has a unique resonance characteristic. Current actuator arms are made of stainless steel, aluminum or magnesium. Suspensions are typically made of stainless steel. The resonance characteristics of the arm are such that the bending modes and torsion modes have frequencies that are within the same frequency range as the suspension and the magnetic storage disk (1 kHz to 8 kHz). Great care must be used when designing an actuator system to prevent alignment of resonance modes that would create very high gains and an unstable servo performance.

In other words, in the presence of a resonance, the transducer or read/write head will vibrate causing it to pass across the desired track. When the resonances of the disk and suspension align or are about the same frequency, the frequency response is amplified so that the amplitude of the vibration is higher and the read/write head travels farther away from the desired track during the track crossings.

Stainless steel or metal arms could be made thicker to increase the bending and torsion mode frequencies, but the greater mass significantly degrades the performance of the actuator assembly by increasing the moment of inertia of the arm. Inertial increase will decrease the access time to transition between data tracks and increase the current requirements necessary to move the voice coil motor. Increased current results in increased heat within the disk enclosure and increased power requirements.

A thicker steel will also result in a higher mass assembly that will cause significant degradation of shock resistance of the disk drive system. Higher mass assemblies also imply less stability in the form of head lift-off. When a large shock impulse in the vertical direction is applied to the actuator arm, the head gimbal assembly "lifts off" and lands back on the disk surface. This damages the memory disk. Other metals such as aluminum have been used, but the key parameter determining the resonance characteristics of the actuator arm is the stiffness to mass ratio of the material, which is about the same for aluminum and stainless steel. Of currently available materials that have been used as actuator arms, only beryllium and ceramics have significantly higher stiffness to mass ratios over that of currently used stainless steel or aluminum. Beryllium is quite expensive and difficult to process while ceramics are prone to crack, particularly under shock load conditions. As a result, these materials have not become market acceptable.

The demand for greater track density is increasing steadily, so increasing the performance of the actuator assembly by increasing the resonance frequencies of the arm, the suspension and the entire actuator assembly is becoming a requirement for future systems. There is also a need for a disk drive system with lower access times. Furthermore, there is a need for a more stiff actuator arm since stiff arms have higher resonant frequencies associated with the various bending modes. There is also a need for an actuator arm where the stiffness can be controlled in various directions so that the resonances can be changed to frequencies other than the resonant frequencies of other components of the disk drive. There is still a further need for an arm that has a high stiffness to mass ratio such that the length of the arm can be extended to replace the suspension material, which typically has a lower stiffness to mass ratio. Suspensions are typically made out of stainless steel.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator arm is made of a material having a stiffness to mass ratio which is higher than an arm made of aluminum, magnesium or stainless steel. The actuator assembly includes a suspension attached to the actuator arm. The suspension has a length less than ⅔ times the length of the actuator arm. For example, in a 3.5 inch disk drive having a disk with a diameter of approximately 95 mm, the suspension has a length of 10 mm or less. In a 2.5 inch disk drive having a disk with a diameter of approximately 65 mm, the suspension has a length of 10 mm or less. The actuator can be made of any material having a stiffness to mass ratio greater than stainless steel, aluminum or magnesium. The stiffness to mass ratio is also known as the specific stiffness of a material. The material of the arm has a specific stiffness of 200 in.$\times 10^6$ or greater. Such materials include composites with stiffening fibers and ceramics.

The suspension is made of stainless steel. When the actuator arm is made of a very light stiff material which is stiffer than aluminum, stainless steel or magnesium, then the natural resonance frequencies of the arm are higher than those of the suspension. The natural resonance frequencies of the arm are higher than those of the suspension when the arm is made of a material having a specific stiffness greater than $200 \times 10^6$. The material of the actuator arm may be a ceramic material or a composite arm of several materials. The arm may include stiffening fibers in one layer, several layers or even wrapped around a ceramic core. Such an actuator arm made of material or constructed to have a specific stiffness greater than $200 \times 10^6$ resonates at much higher frequencies than presently used aluminum or magnesium (ceramic at 5 kHz versus aluminum at 2.7 kHz for the same resonance mode). Extending the length of the actuator arm will lower the resonance frequency of the high stiffness arm, but will keep the resonance of the arm higher than the suspension resonance. Shorter suspensions inherently have higher resonance frequencies. If other parameters of the suspension (thickness, etc.) remain constant, shortening the suspension increases the resonant frequency of the suspension.

With an arm or actuator made of high stiffness material, the length of the actuator arm can be increased such that it still resonates at lower frequencies than the suspension. By shortening the length of the actuator arm and increasing the length of the suspension, the resonance frequency of the entire arm/suspension assembly is increased. Depending on the high stiffness material used, the optimum ratio of the length of the actuator arm to the length of the suspension is 1.5 to 10.0. The arm and the suspension can be thought of as having a fixed length for a certain disk drive size design size. The length of the arm made of the high stiffness to mass material, is then extended and the length of the suspension shortened to form a higher resonance actuator of the same overall length.

The invention also goes to the method for determining the length of the actuator arm. The resonance frequencies of both the actuator arm and the suspension are a function of their length. The length of the actuator arm and the length of the suspension are selected so that the assembly resonates at the best possible frequency and phase shift as a unit. This produces an optimum performance of the actuator for the best overall performance in a disk drive assembly. The arm/suspension assembly can then further be tuned to frequencies that are not co-incident to other resonance frequencies in the disk drive by changing the arm resonances.

Advantageously, by lengthening the arm made of a material having a higher stiffness to mass ratio, an actuator/suspension assembly that resonates at higher resonant frequency which is outside the operating range of the current actuator/arm assemblies is formed. The amplitude of the resonant frequency can also be controlled. The actuator arm/suspension allows for greater track density and increased performance since it does not resonate in the operating range of the servo control bandwidth. More closely spaced tracks can be followed and lower access times are also achievable with this system. Advantageously, the actuator arm is lighter and stiffer such that the resonant frequencies are shifted to the higher end of the frequency spectrum when compared to current steel or metal actuator arms in which the length of the arm is approximately equal to the length of the suspension.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
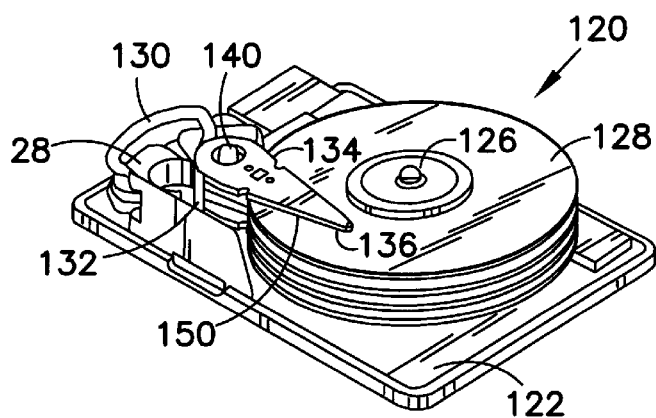
FIG. 1 is an isometric view of a disk drive having a rotating disk, an actuator, and an arm made of a composite material.
Figure 2:
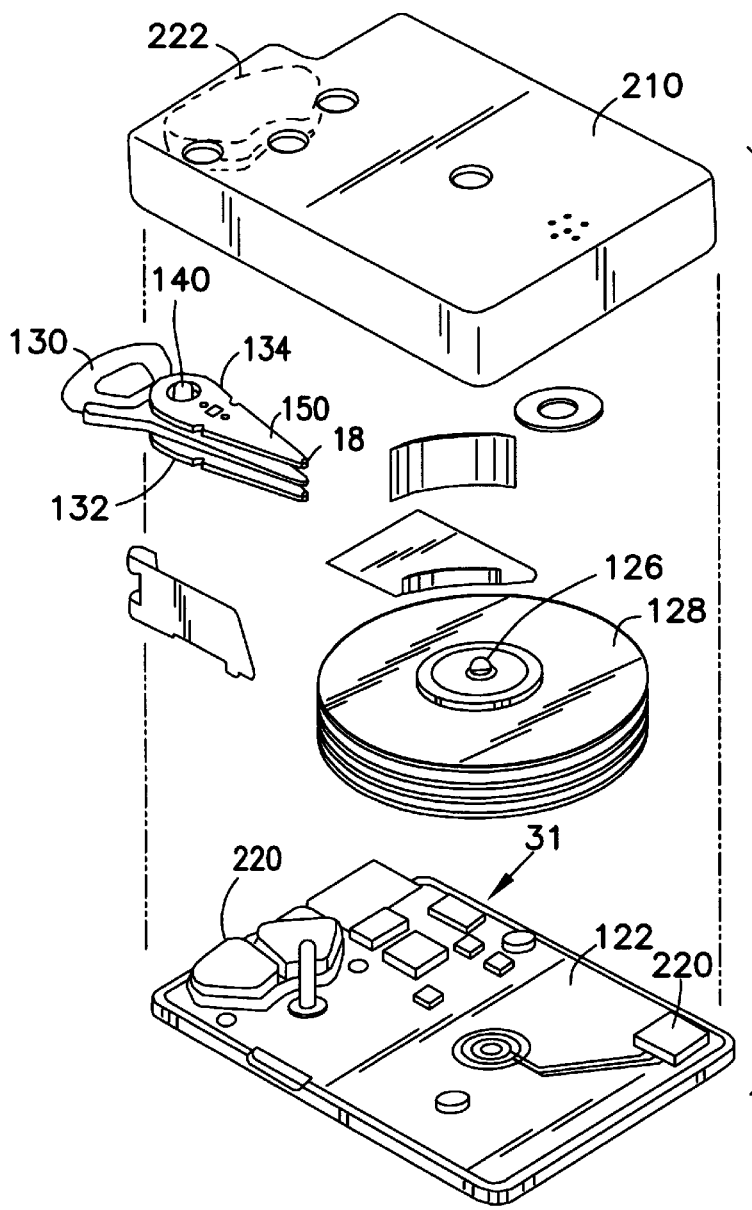
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in transducing relation to the disk 128. The arms 134 are attached to a pivot apparatus, such as a bearing cartridge 140. Attached to the arms 134 are the suspensions 150. The transducers 136 are encapsulated within or supported by a slider or small ceramic block. The slider carries the transducer over the disk. The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to actuate the assembly 132 and more specifically the transducers 136, also commonly referred to as read/write heads, to different radial positions relative to one or more surfaces of the disk 128.

Figure 3:
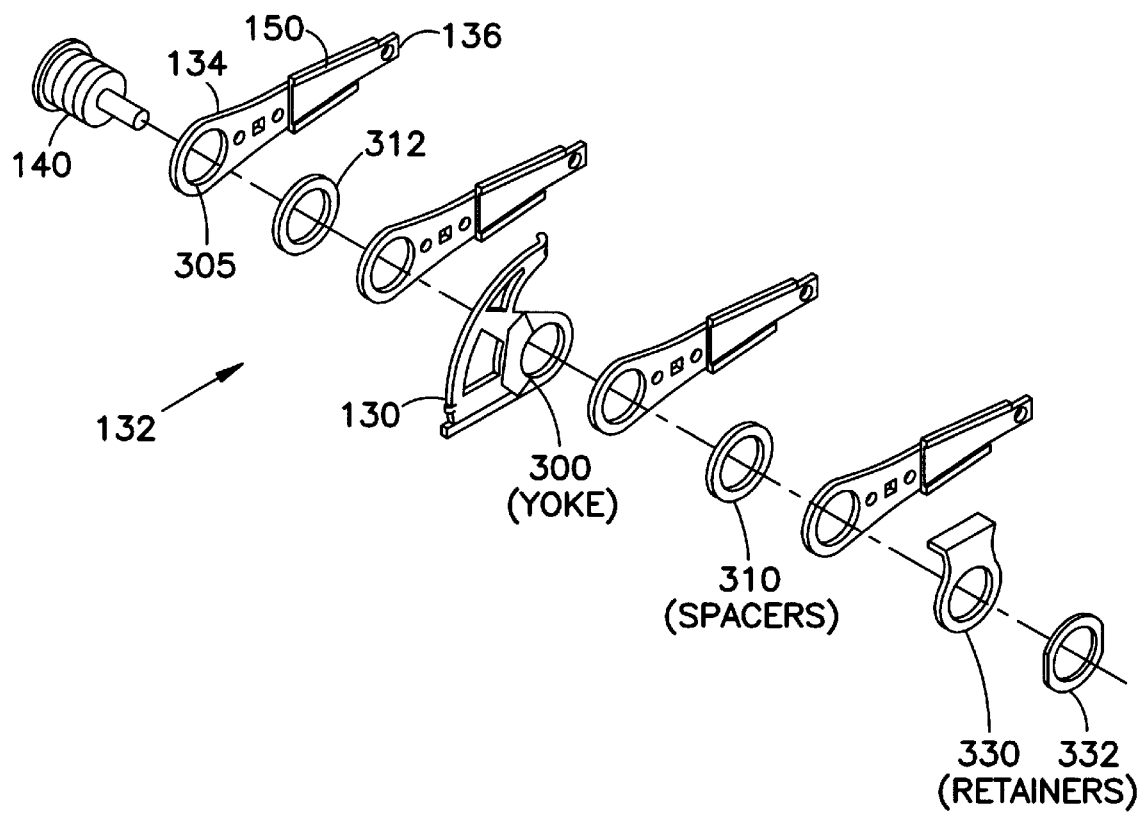
FIG. 3 is an exploded isometric view of an actuator assembly.

FIG. 3 is an exploded isometric view of an actuator assembly 132. The actuator assembly 132 includes a number of arms 134 having suspensions 150 attached to each of the arms. Attached to each of the suspensions 150 is a transducer 136. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism. Each of the arms 134 includes an opening which can receive a rod or other withdrawable tool that can be used for alignment of the various components of the actuator assembly 132.

Figure 4A:
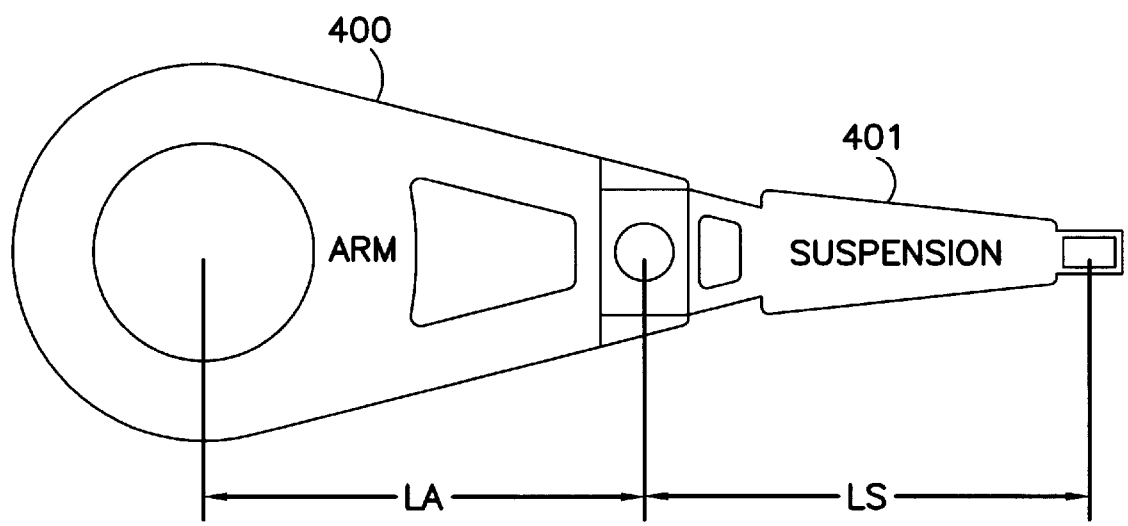
FIG. 4A is a top view of an actuator arm used in the prior art.

FIG. 4A is a top view of a prior art arm 400 and suspension 401 arrangement. The length of the arm 400, designated LA, is approximately equal to the length of the suspension 401, designated LS. The ratio of the length of the arm 400 to the length of the suspension 401 is therefore approximately 1:1. The ratio of the length of the arm 400 to the length of the suspension 401 varies ±0.4. Disk drives usually come in several industry standard sizes. One size is a 3.5 inch disk drive. In these drives the disk is typically 95 mm in diameter and a 18–22 mm suspension is used. Another common size is a 2.5 inch disk drive. In these drives, the disk typically has a 65 mm diameter and a 11–14 mm suspension is used. In each case, the length of the suspension 401 is approximately equal to or slightly less than the length of the arm 400 of the actuator assembly. The length of the arm is typically restricted by the property of the arm. Current arms are made of magnesium, aluminum or steel. The stiffness to mass ratio of each of these materials is insufficient to allow a longer arm. Simply put, the arm is not extendable in length since the material is not stiff enough with respect to its weight and the suspension weight to prevent relatively low frequency resonance. Attempting to lengthen the arm 400 made of the current materials (magnesium, aluminum or steel) results in a resonant frequency associated with the first mode of bending below 1 kHz. This is in the servo control operating range of the actuator assembly and has been a limiting factor to extending the arm 400.

Figure 4B:
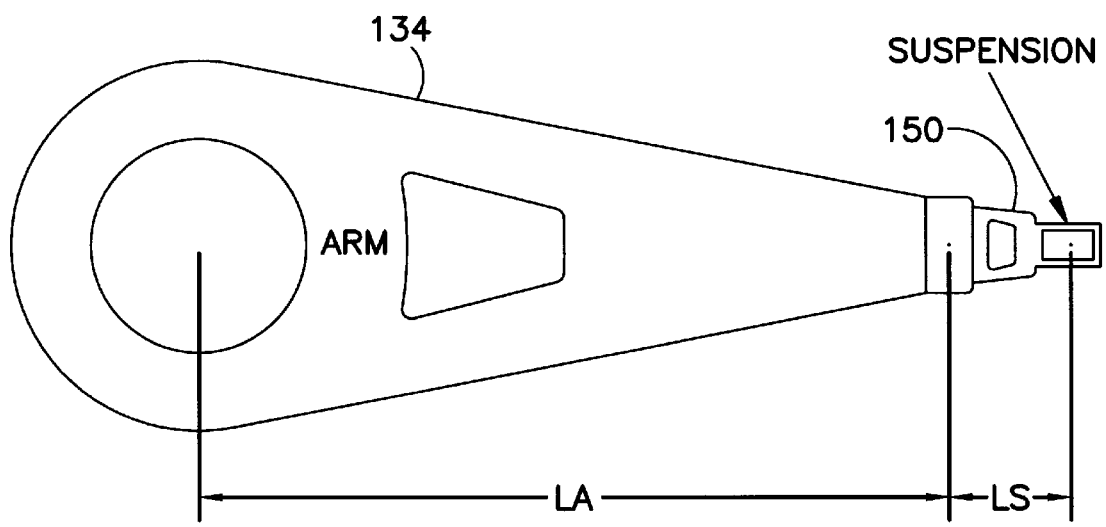
FIG. 4B is a top view of an actuator arm used in this invention.

FIG. 4B is a top view of the arm 134 and suspension 150 of this invention. The arm 134 is made of a material having a higher stiffness to mass ratio than magnesium, aluminum or steel. The arm 134, as discussed in the following discussion with respect to FIG. 5, is made of a composite material having one or more layers of material which include elongated stiffening fibers. The length of the arm 134, designated LA, is longer than the length of the suspension 150, designated LS. The optimum ratio for a very light stiff arm of the length of the arm 134 to the length of the suspension 150 ranges from 2.0:1 to 10:1. The ratio of the of the length of the arm 134 to the length of the suspension 150 preferably falls within a range of 2.5:1 to 5:1. The length of the arm 134 is longer since it has higher stiffness to mass ratio than the materials previously used to make the arm. In other words, the arm can be extended since the material used to build the arm 134 is stiffer for a given mass. The material has a specific stiffness of 200×106 in. or greater. Since suspensions are typically made of stainless steel (an alloy of steel) the stiffness to mass ratio of the arm is also higher than the stiffness to mass ratio of the suspension. As a result, extending the length of the arm 134 serves to stiffen the actuator assembly 132 so that it resonates at higher frequencies outside the range of operation of the servo bandwidth of the actuator assembly as it does seek operations in a disk drive.

Figure 5A:
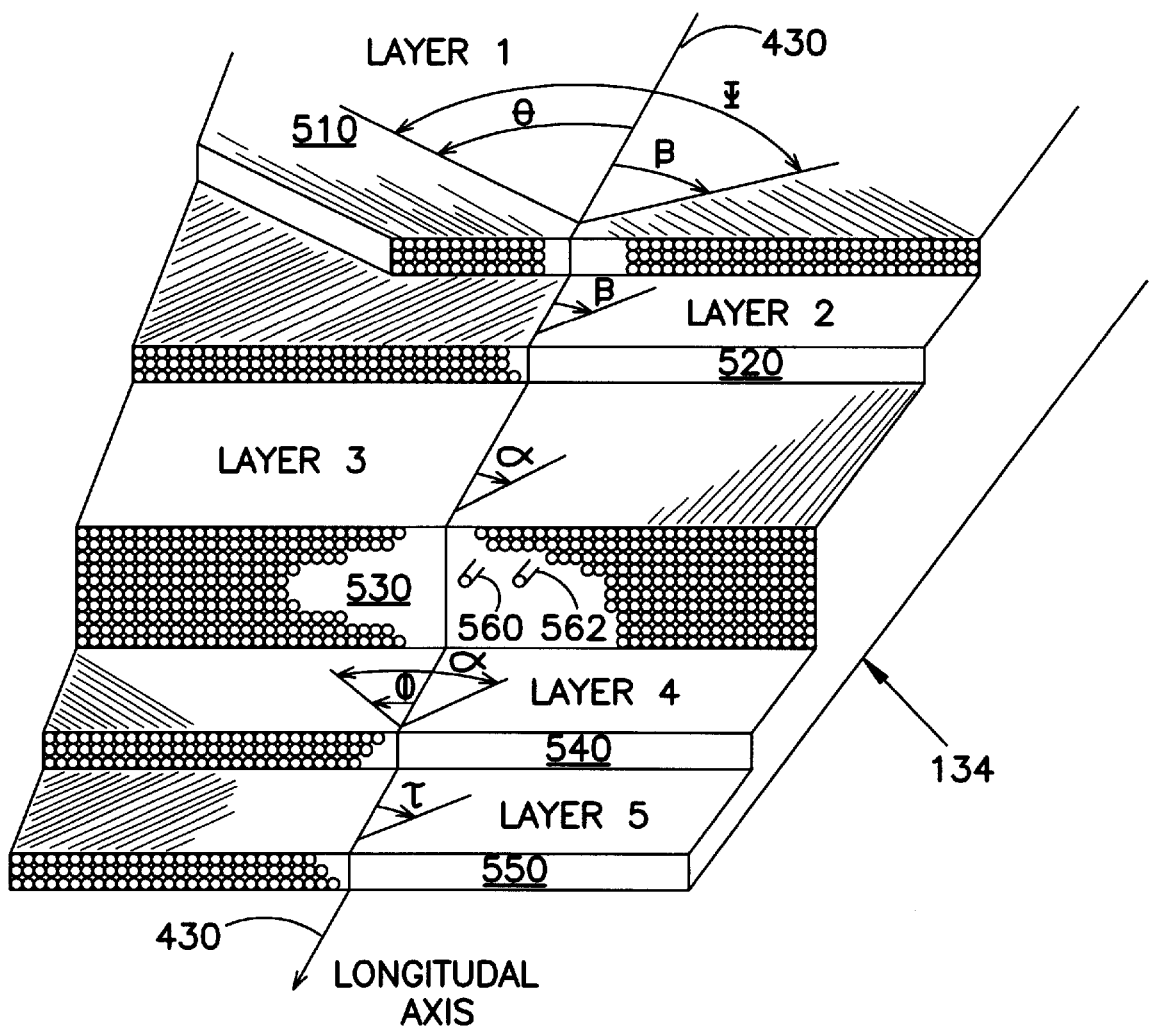
FIG. 5A is a cutaway view of the actuator arm showing the directions of the fibers in the various layers of the arm.

Now turning to FIG. 5A, a cutaway view of the actuator arm 134 showing the various layers of the composite material is shown. The arm 134 is comprised of five layers, 510, 520, 530, 540 and 550, of elongated fibers. The elongated fibers can be of carbon or boron or a similar material which is good in tension and compression. Each layer 510, 520, 530, 540 and 550 includes a multiplicity of the elongated fibers placed substantially parallel to one another. The elongated fibers stiffen the arm 134 in one direction and are sometimes referred to as stiffening fibers. An example of this material is available from Hexel of San Francisco, Calif. and is commonly referred to by the trade name IM7. The middle layer 530 of the arm 134 is placed so that the elongated fibers within the layer 530 are substantially parallel to the longitudinal axis 430 of the arm 134 ($\gamma$~0). The elongated fibers in the remaining layers 510, 520, 540 and 550 are orientated at specific angles ($\theta$, $\beta$, $\phi$, $\tau$, respectively) both with respect to the longitudinal axis 430 as well as to each other to stiffen the torsional and sway modes of resonance and to also stiffen the bending modes of the arm 134. By varying the various angles shown, the resonant frequency of the arm 134 can be selected. In other words, by varying the various angles, the various resonant modes can be varied to resonate at a different frequency. Layer 510 is laid at an angle $\theta$ with respect to the longitudinal axis 430. As shown in FIG. 5, the longitudinal axis 430 has been also placed on the top of the arm 134 and is labeled as 430'. The longitudinal fibers of the second layer 520 make an angle $\beta$ with respect to the longitudinal axis 430. The elongated fibers in layer 510 make an angle $\psi$ ($\psi=\theta+\beta$) with respect to the elongated fibers of layer 520. Generally, $\psi$ will be an angle of 90° if maximum strength is wanted between the two layers 510 and 520. However, the angle $\psi$ can be varied to vary the resonance of the actuator arm. Positioned between the layer 520 and the layer 530 are a pair of conductors or electrical signal-carrying wires 560 and 562. Advantageously, the signal-carrying wires 560 and 562 are formed between two layers 520 and 530 so that they do not have to be attached to the exterior portion of the arm 134. The elongated fibers in layer 540 make an angle $\phi$ with respect to the longitudinal axis 430 of the arm 134 and the elongated fibers of layer 550 make an angle $\tau$ with respect to the longitudinal axis 430 of the arm 134. The elongated fibers in layer 540 make an angle $\alpha$ with respect to the elongated fibers in layer 550. Once again, the angle $\alpha$ would be approximately 90° to obtain the maximum amount of strength and stiffness between the layers 540 and 550, however, the angle $\alpha$ can be varied to vary the resonant frequency of the arm 134.

Basically, the angular relationship is computed by initializing $\theta$, $\beta$, $\phi$, and $\tau$, at 45° and $\gamma$ at 0°. The basic form factor of the arm is then determined from the available space and geometrical requirements of the specific disk drive design. Using the initial angles, and form factor (including tooling holes), the arm is computer modeled and the frequency of the natural resonance modes are calculated and compared to the disk stack resonance frequencies and the head/ suspension resonance frequency. Vibrational modes of the arm that are frequency co-incident to significant vibrational modes of the disk stack or the suspension are then targeted for change. Bending mode frequencies are affected by changing the relative thickness of layer 530 with respect to the other four layers 510, 520, 540, and 550. The bending mode frequency is affected by the number of elongated fibers which are substantially parallel to the longitudinal axis 430 of the arm 134. Torsion or sway modes are affected by the angles $\theta$, $\beta$, $\phi$, and $\tau$. Decreasing the angles $\theta$, $\beta$, $\phi$, and $\tau$ will move the torsion modes down in frequency. Increasing the angles $\theta$, $\beta$, $\phi$, and $\tau$ will increase the torsion mode frequencies, and lower the frequency of the bending modes. Mode frequency movement must be iterated to obtain an acceptable frequency spectrum. Current computer modeling programs, such as Parametric Computing Technology's "Mechanica", can be set to obtain a "best fit" for the actuator arm. In other words, the resonant frequencies of the various vibrational modes of the arm can be shifted to the frequency gaps in the combined disk and suspension frequency spectrums.

Figure 5B:
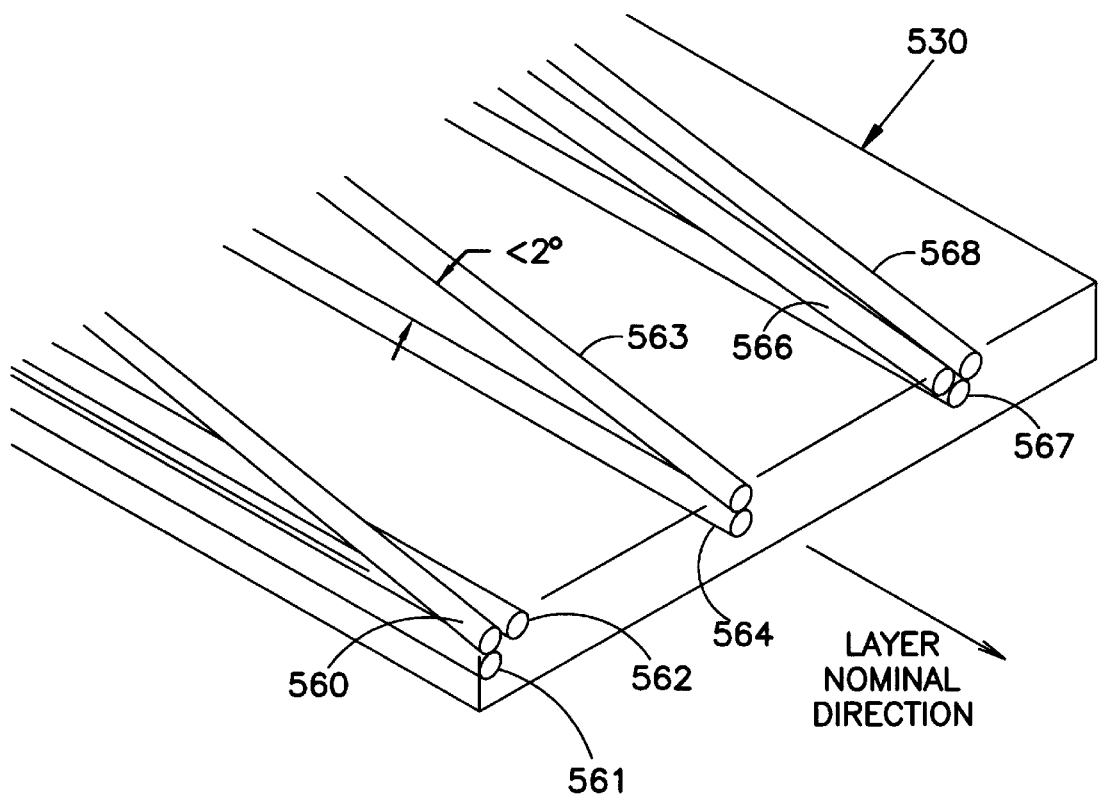
FIG. 5B is a cutaway view of the actuator arm showing the directions of the individual fibers in one of the layers of the arm.

FIG. 5B is a cutaway perspective view showing the individual elongated stiffening fibers in one layer of a composite arm. The layer shown is layer 530. The elongated stiffening fibers are shown in bundles. One bundle is comprised of fibers 560, 561 and 562. A second bundle is comprised of fibers 563 and 564 and the third bundle is comprised of fibers 566, 567 and 568. The elongated stiffening fibers 563 and 564 of the second bundle show a slight angle 580 between adjacent elongated fibers. The slight angle provides for a dampening of the gain associated with resonance in the general direction of the fibers. Thus, in addition to the ability to vary or shift the resonant frequency associated with the arm 134, the gain can be tailored to produce dampening at specific frequencies for optimum actuator disk system performance. The angle 580 between the elongated fibers is generally 3 degrees or less, and preferably 2 degrees or less.

It should be noted that the number of layers need not be limited to five as shown in FIG. 5. An actuator arm 134 can have more or less layers than five. Another aspect of this invention is that the fibers within a layer can be slightly offset with respect to one another to provide dampening of any vibrations or resonant frequencies that occur. For example, layer 520 could be formed of component fibers in the layer of the material using elongated fibers. The two component fiber groups in the layer could be slightly angularly offset from one another so that a shallow angle or very small angle is formed between the component elongated fibers in the layer. By forming a slight angle or offset between component fibers in the layer, dampening is the result. Dampening can be used to lessen the magnitude of the gain at resonant frequency or the magnitude of the displacement of the material. This is accomplished by the slight angular difference of the fibers producing a slight twisting action within the layer whenever the layer is deformed. This dissipates the energy of the vibration. Some misorientation occurs naturally during fiber lay-up, but if greater dampening is required, deliberate misorientation during fiber lay-up can be used to reduce the gain of the resonance peaks. All or only selected layers could be deliberately misorientated. Generally, the amount of misorientation is kept at an angle of 2° or less. The angle is the angle between two adjacent or substantially adjacent elongated fibers.

Once the angles $\alpha$, $\beta$, $\gamma$, $\theta$, $\psi$, $\phi$ and $\tau$ are determined by the process above, the actuator arm 134 can be formed. The arm is fabricated by precisely laying the layers of elongated carbon fibers, such as 510, 520, 530, 540 and 550 at the determined angular relationships with respect to each other. After the layers are laid down, the arm is molded to the shapes, such as shown in FIG. 4. The fibers are then injected with an epoxy or thermoplastic material which is also known as a binder while the arm 134 is molded. The fibers may also be coated with prepreg prior to being laid in their special orientation and fused during the molding operation. If the elongated fibers are made of carbon, an arm is produced that is not only light and stiff, but unlike ceramic components, will not fracture. The multi-layer carbon fiber composites are resistant to catastrophic failure. Individual fibers may break but the overall structure is quite resistant to fracture propagation. The result is that the composite actuator arm 134 is robust in both manufacturing shock loads as well as operating shock loads. In addition, the low mass and high stiffness of the arm reduces the disk damage effects by limiting the vertical head motion. When carbon is used, the resulting arm is approximately 55% to 80% carbon by volume. The remainder is binder. The binder can be any of a number of materials including epoxy, aluminum, thermoplastic or any other material used to form the composite structure.

The elongated fibers can be also made from something different than carbon. The elongated fibers can be made of silicon carbons with a SiC, BAl, boron, $BAl_2SiO_3$, alumina or any other continuous filament fiber. These are types of elongated fibers available in the industry. In addition to selecting the elongated fibers for their characteristic stiffness in a particular direction, other criteria may also be used to select certain fibers. For example, if heat will be generated on the arm 134, fibers that are thermally conductive may be selected. In addition, some of the fibers of a particular layer may be substituted with elongated fibers of another material. Graphite elongated fibers are excellent heat conductors. The resulting composite arm 134 formed would then have a built-in heat sink which could be used to facilitate placing chips directly onto the arm 134. The resulting arm would still be stiff and the resonant frequencies could be varied and, advantageously, the arm would be capable of carrying heat away from a heat source. Other elongated fibers may have other characteristics which are desirable to build in to the composite structure of the arm 134. These other fibers could also be substituted into a layer or layers of the composite arm.

It should also be noted that any arm 134 made of a material with a stiffness to mass ratio greater than aluminum, steel or magnesium (greater than $200 \times 10^6$ in.) could be used to make an extended arm that improves the resonance characteristics of the actuator assembly 132. The arm 134 is not limited to the composite structure shown in FIGS. 5A and 5B. Other composite structures or other materials, such as $AlB_4C$ made by Dow Chemical, pure beryllium, or any ceramic material such as SiC, SiN, AlN, etc. could be used as arm materials. Likewise, design structures of any material that achieves a high specific stiffness by design, such as a monocoque or a hexagonal unit, could also be used to form an actuator arm of high stiffness to mass ratio.

Figure 6A:
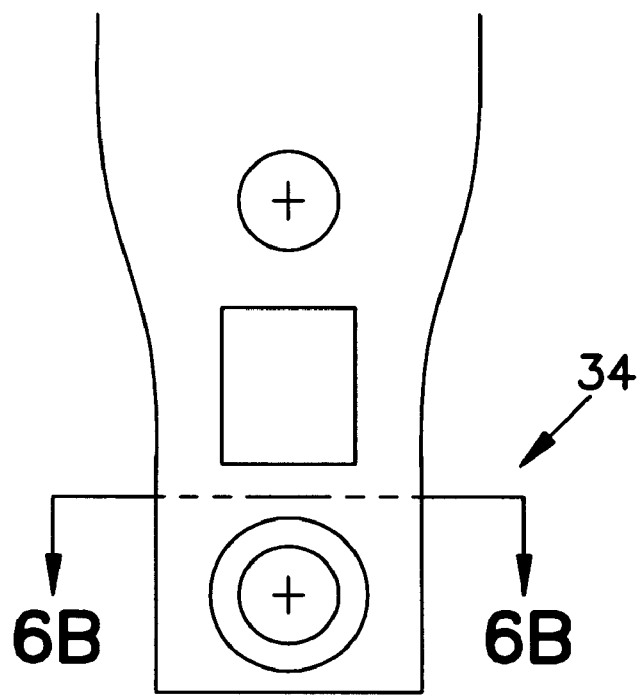
FIG. 6A is a top view of another embodiment of the arm of the actuator assembly.
Figure 6B:
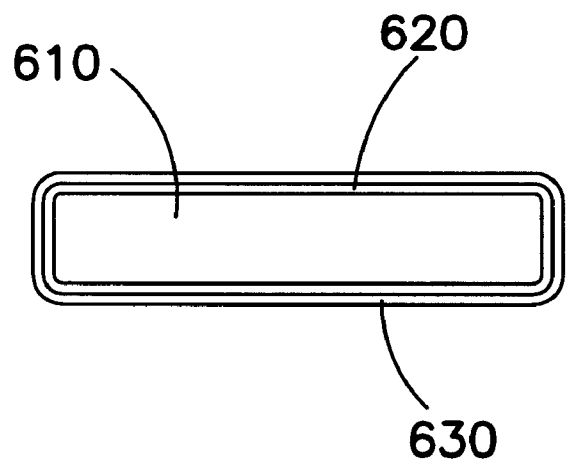
FIG. 6B is a cross-sectional view of the arm along line 6B—6B show in FIG. 6A.

FIGS. 6A and 6B show another embodiment of the arm of the actuator assembly which is made from a core of ceramic material covered by several layers of material having elongated stiffening fibers. The arm 634 has the same shape as the arm 134. The arm 634 also has the same tooling holes and attachment holes. Now turning to FIG. 6B, which is a cross-sectional view of the arm 634 along cutline 6B—6B, it can be seen that the arm is comprised of a ceramic inner core 610. The ceramic inner core 610 is made of a ceramic material such as $AlB_4C$ cermet which is available from Dow Chemical Co. of Midland, Mich. A first layer of material having elongated fibers 620 is wrapped around the ceramic core 610. In addition, a second layer of material 630 having elongated fibers is also wrapped around the core 610 and the first layer 620. The elongated fibers in the first layer 620 make an angle with respect to the elongated fibers in the second layer 630. This arrangement of a core 610 and two layers of material having elongated fibers therein 620, 630 provides for a stiff, light arm 634. These arrangements of a core of either ceramic or composite fibers with outer layers of either fiber composite or ceramic layers, respectively, allow further design control of the frequency and internal mass of the actuator arm.

An arm made of a ceramic material can also be used. The shape of the arm would be much the same as is shown in FIGS. 6A and 6B. The arm would be made from cermet, a material made by Dow Chemical of Midland, Mich.

The resonant frequencies of the arm and the suspension are both a function of their length. The length of the arm and the length of the suspension are chosen in concert to optimize the system performance. The resonant frequencies must be balanced so that the net result is the highest frequency arm/suspension resonance modes possible. A material having a higher stiffness to mass ratio allows for a longer arm length that resonates at a higher frequency. The length of the arm is selected. Since the stiffness to mass ratio of a composite arm is much higher than stainless steel, aluminum, or magnesium, the arm can be elongated and still have a resonance at a frequency which is higher than a shorter arm of stainless steel, aluminum, or magnesium. Since the arm and suspension combination is a fixed length in a particular design, the elongation of the arm means that the length of the suspension will be shortened. The shortening of the suspension will also increase the resonant frequency of the suspension so that the combined resonance of the arm/suspension will be higher than previously possible. The resonant frequency can be optimized in this high region.

Advantageously, a lower mass actuator arm is produced in which the resonant frequency of the actuator arms can be shifted to a selected resonant frequency. The amplitude of the resonant frequency can also be controlled. The actuator arm allows for greater track density and increased performance. Lower access times are also achievable with this system. Advantageously, the actuator arm is lighter and stiffer such that the resonant frequencies are shifted to the higher end of the frequency spectrum when compared to current steel or metal actuator arms. The stiffness of the arm can also be controlled in various directions so that the resonances can be changed to frequencies other than the resonant frequencies of other components of the disk drive.

It is to be understood that the above description is intended to be illustrative, and not restrictive. Many other embodiments will be apparent to those of skill in the art

What is claimed is:

1. A disk drive comprising:

an actuator having a first end and a second end;

a motor for moving the actuator, a portion of said motor attached to one of the first end or the second end of the actuator;

an actuator arm attached to the other of the first end or the second end of the actuator;

a suspension attached to the actuator arm, said suspension having a length less than ¼ times the length of the arm; and a transducer attached to the suspension so that the motor for moving the actuator also moves the transducer, said actuator aim having:
a first layer of material including a plurality of elongated fibers orientated in a first direction; and
a second layer of material including a plurality of elongated fibers orientated in a second direction, said second direction differing from the first direction, wherein said first and second layers are part of a composite material, the composite material increasing the resonant frequency of the actuator arm of a given geometry to allow an arm which is about four times or more the length of the suspension, said arm having approximately the same resonant frequency as the resonant frequency of the suspension.

2. The disk drive of claim 1 further comprising:

a base;

a spindle attached to said base;

a hub attached to said spindle;

a spindle motor attached to the base and to the spindle for rotating the hub; and a disk attached to the hub, said disk having a diameter of approximately 95 mm, said suspension having a length of 10 mm or less.

3. The disk drive of claim 2 further comprising:

a first wire attached to the transducer; and a second wire attached to the transducer, said first and second wires having portions embedded in the actuator arm.

4. The disk drive of claim 2 wherein the elongated fibers of the actuator arm include heat conducting fibers for carrying heat from one portion of the actuator arm to another portion of the actuator arm.

5. The disk drive of claim 1 further comprising:

a base;

a spindle attached to said base;

a hub attached to said spindle;

a spindle motor attached to the base and to the spindle for rotating the hub; and a disk attached to the hub, said disk having a diameter of approximately 65 mm, said suspension having a length of 10 mm or less.

6. The disk drive of claim 5 further comprising:

a first wire attached to the transducer; and a second wire attached to the transducer, said first and second wires having portions embedded in the actuator arm.

7. The disk drive of claim 5 wherein the elongated fibers of the actuator arm include heat conducting fibers for carrying heat from one portion of the actuator arm to another portion of the actuator arm.

8. The actuator of claim 1 wherein the angle between adjacent elongated fibers in one of the first or second layers is selected so as to dampen vibrations that occur along the length of the elongated fibers.

* * * * *